(12) United States Patent
Matsubara et al.

(10) Patent No.: US 9,045,621 B2
(45) Date of Patent: Jun. 2, 2015

(54) LIQUID CRYSTALLINE POLYESTER COMPOSITION AND METAL COMPOSITE MOLDED PRODUCT USING THE SAME

(75) Inventors: Satoshi Matsubara, Nagoya (JP); Hideyuki Umetsu, Nagoya (JP); Takayuki Hase, Nagoya (JP)

(73) Assignee: Toray Industries, Inc. (JP)

( * ) Notice: Subject to any disclaimer, the term of this patent is extended or adjusted under 35 U.S.C. 154(b) by 350 days.

(21) Appl. No.: 13/638,052

(22) PCT Filed: Dec. 14, 2011

(86) PCT No.: PCT/JP2011/006990
§ 371 (c)(1),
(2), (4) Date: Sep. 28, 2012

(87) PCT Pub. No.: WO2012/117475
PCT Pub. Date: Sep. 7, 2012

(65) Prior Publication Data
US 2013/0022828 A1  Jan. 24, 2013

(30) Foreign Application Priority Data

Feb. 28, 2011 (JP) .................................. 2011-041544

(51) Int. Cl.
*C08K 3/34* (2006.01)
*C08L 67/00* (2006.01)

(52) U.S. Cl.
CPC .. *C08K 3/34* (2013.01); *C08L 67/00* (2013.01)

(58) Field of Classification Search
None
See application file for complete search history.

(56) References Cited

U.S. PATENT DOCUMENTS

2011/0089371 A1  4/2011 Murouchi et al.

FOREIGN PATENT DOCUMENTS

| JP | 4-13758 A | 1/1992 |
|----|-----------|--------|
| JP | 4-76049 A | 3/1992 |
| JP | 2002-294038 A | 10/2002 |
| JP | 2005-200495 A | 7/2005 |
| JP | 2005-255914 A | 9/2005 |
| JP | 2007-254716 A | 10/2007 |
| JP | 2007-254717 A | 10/2007 |
| JP | 2008-138181 A | 6/2008 |
| JP | 2008-291234 A | 12/2008 |
| JP | 2009-215530 A | 9/2009 |
| JP | 2010-138228 A | 6/2010 |
| JP | 2011-046191 A | 3/2011 |
| WO | 2009/119863 | 10/2009 |

OTHER PUBLICATIONS

Corresponding Supplementary European Search Report dated Mar. 2, 2015 of European Application No. 11859727.7.
"Product Information," *Nippon Talc Co., Ltd.*, 2015, http://www.nippon-talc.co.jp/seihin_e.htm.

*Primary Examiner* — Ramsey Zacharia
(74) *Attorney, Agent, or Firm* — DLA Piper LLP (US)

(57) ABSTRACT

A liquid crystalline polyester composition containing at least 100 parts by weight of liquid crystalline polyester (A) and 10 to 100 parts by weight of talc (B). The talc (B) has a ratio (a1/a2) of oil absorption (a1) ml/100 g to specific surface area (a2) m2/g in a range of 14.0 to 26.0 (ml·g)/(100 g·m2) and has a number-average particle diameter of 10 to 30 μm.

14 Claims, 4 Drawing Sheets

LIQUID CRYSTALLINE POLYESTER COMPOSITION AND METAL COMPOSITE MOLDED PRODUCT USING THE SAME

RELATED APPLICATIONS

This is a §371 of International Application No. PCT/JP2011/006990, with an international filing date of Dec. 14, 2011 (WO 2012/117475 A1, published Sep. 7, 2012), which is based on Japanese Patent Application No. 2011-041544, filed Feb. 28, 2011, the subject matter of which is incorporated by reference.

TECHNICAL FIELD

This disclosure relates to a liquid crystalline polyester composition and a metal composite molded product using the same.

BACKGROUND

In recent years, with increased demand for high-performance plastics, lots of polymers of various novel properties have been developed and come on the market. Liquid crystalline resins having characteristic parallel arrangement of molecular chains and showing optical anisotropy, such as liquid crystalline polyester, have received particular attention, because of their excellent moldability and mechanical properties, and their applications have been expanded to mechanical components and electric and electronic components. In particular, such liquid crystalline resins are favorably used for electric and electronic components requiring the high flowability, such as connectors.

Accompanied with recent size reduction and weight reduction of equipment, there has been increasing demand for mechanical components and electric and electronic components having the less wall thickness and the more complicated shape. Products using environmentally-conscious lead-free solder have become popular in recent years. Lead-free solder requires extremely higher soldering temperature than conventional solder, so that a molded product obtained from the resin composition is subjected to reflow process at high temperature. Molded products obtained from the conventionally known resin compositions have accordingly the potential warpage during the reflow process. The high degree of warpage in the reflow process causes poor soldering.

To reduce the warpage of the molded product during the reflow process, one proposed liquid crystalline polymer composition obtained by blending 1 to 200 parts by weight of talc having the average particle diameter of 5 to 100 μm and the aspect ratio of 3.0 to 5.0 relative to 100 parts by weight of liquid crystalline polymer (e.g., see JP 2008-138181 A). As liquid crystalline polyester composition having excellent heat resistance and impact resistance, one proposed liquid crystalline polyester composition obtained by blending 10 to 150 parts by weight of talc having the average particle diameter of 2.5 to 3.5 μM and 10 to 150 parts by weight of glass fiber having the average fiber diameter of 3 to 9 μm relative to 100 parts by weight of liquid crystalline polyester (e.g., see JP H04-76049 A). Molded products obtained from such proposed resin compositions reduce the warpage before the reflow process but still have insufficient effect on reduction of the warpage during the reflow process and cause a large variation in flowability.

Molded products obtained from the liquid crystalline resin compositions are often used as metal composite molded products and thereby require the high degree of metal adhesion. The low degree of metal adhesion may cause trouble, such as separating the metal part from the molded product during attachment or detachment of the metal composite molded product to, for example, a substrate. By taking into account the foregoing, with an aim to improve the metal adhesion, one proposed liquid crystalline polyester contains aromatic hydroxydicarboxylic acid, aromatic dicarbonates, diol components and specific phosphorus compound in the molecular chain (e.g., see JP 2005-255914 A). To improve the adhesiveness with epoxy resin or silicone resin, one proposed liquid crystalline resin composition contains 70 to 150 parts by weight of scale-like fillers having the number-average particle diameter of not less than 8 μm relative to 100 parts by weight of liquid crystalline resin (e.g., see JP 2007-254716 A). With an aim to improve the thermal deformation temperature and the blister resistance, one proposed liquid crystalline resin composition obtained by blending 5 to 60 percent by weight of talc having the specific surface area of not greater than 5 $m^2/g$ and the average particle diameter of not greater than 40 μm to the thermotropic liquid crystalline polymer (e.g., see JP H04-13758 A). Molded products obtained from such polymer compositions still have insufficient effects on reduction of the variation in flowability and reduction of the warpage during the reflow process.

Recent size reduction and refinement of molded products requires satisfaction of the high degrees of warpage reduction, flowability and metal adhesion. The proposed techniques, however, still do not sufficiently satisfy all these requirements. Therefore, it could be helpful to provide a liquid crystalline polyester composition having high flowability, less variation in flowability, that gives a molded product having high metal adhesion and reduced warpage during reflow process.

SUMMARY

We thus provide:
(1) A liquid crystalline polyester composition, at least containing 100 parts by weight of liquid crystalline polyester (A) and 10 to 100 parts by weight of talc (B), wherein the talc (B) in the composition has a ratio (a1/a2) of oil absorption (a1) ml/100 g to specific surface area (a2) $m^2/g$ in a range of 14.0 to 26.0 $(ml·g)/(100\ g·m^2)$. In the liquid crystalline polyester composition, a number-average particle diameter is 10 to 30 μm.
(2) The liquid crystalline polyester composition described in (1), wherein the specific surface area (a2) of the talc (B) in the composition is in a range of 0.9 to 1.8 $m^2/g$.
In the liquid crystalline polyester composition described in (1), however, the specific surface area (a2) may be less than 1.0 $m^2/g$. In the liquid crystalline polyester composition described in (1), the specific surface area (a2) may also be greater than 1.8 $m^2/g$.
(3) The liquid crystalline polyester composition described in either (1) or (2), wherein the talc (B) in the composition has residue on 45-micron sieve of 1.0 percent by weight or less relative to a total amount of talc contained in the composition.
In the liquid crystalline polyester composition described in either (1) or (2), however, the residue on 45-micron sieve of the talc (B) in the composition may be greater than 1.0 percent by weight relative to the total amount of talc contained in the composition.
(4) The liquid crystalline polyester composition described in any of (1) to (3), further containing 10 to 100 parts by weight of glass fiber (C), wherein the glass fiber (C) in the composition has a number-average fiber length of 30 to 500 μm.

In the liquid crystalline polyester composition described in any of (1) to (3), however, the content of the additionally contained glass fiber may be less than 10 parts by weight. In the liquid crystalline polyester composition described in any of (1) to (3), the content of the additionally contained glass fiber may also be greater than 100 parts by weight.

(5) The liquid crystalline polyester composition described in any of (1) to (4), wherein the liquid crystalline polyester (A) has structural units (I), (II), (III), (IV) and (V) shown below. In this liquid crystalline polyester composition, content of the structural unit (I) is 65 to 80 mole percent relative to a total amount of the structural units (I), (II) and (III). Content of the structural unit (II) is 55 to 85 mole percent relative to a total amount of the structural units (II) and (III). Content of the structural unit (IV) is 50 to 95 mole percent relative to a total amount of the structural units (IV) and (V):

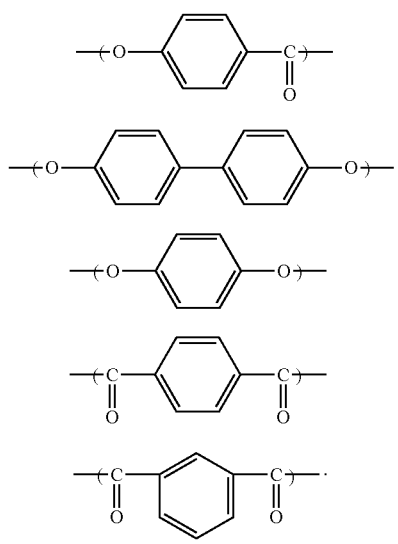

In the liquid crystalline polyester composition described in any of (1) to (4), however, the content of the structural unit (I) may be less than 65 mole percent relative to the total amount of the structural units (I), (II) and (III). The content of the structural unit (I) may also be greater than 80 mole percent relative to the total amount of the structural units (I), (II) and (III).

In the liquid crystalline polyester composition described in any of (1) to (4), the content of the structural unit (II) may be less than 55 mole percent relative to the total amount of the structural units (II) and (III). The content of the structural unit (II) may also be greater than 85 mole percent relative to the total amount of the structural units (II) and (III).

In the liquid crystalline polyester composition described in any of (1) to (4), the content of the structural unit (IV) may be less than 50 mole percent relative to the total amount of the structural units (IV) and (V). The content of the structural unit (IV) may also be greater than 95 mole percent relative to the total amount of the structural units (IV) and (V).

In the liquid crystalline polyester composition described in any of (1) to (4), the liquid crystalline polyester may not include at least part of the structural units (I), (II), (III), (IV) and (V) shown above.

(6) A molded product manufactured by injection molding the liquid crystalline polyester composition described in any of (1) to (5).

The liquid crystalline polyester composition described in any of (1) to (5) may, however, be molded by a different method other than injection molding.

(7) The molded product described in (6) that is a metal composite molded product having a resin part and a metal part joined to the resin part.

The molded product described in (6) may, however, be a different molded product other than the metal composite molded product having the resin part and the metal part joined to the resin part.

(8) The molded product described in (7), the molded product being either a connector or a relay.

The molded product described in (7) may, however, be used as a member other than the connector or the relay.

The liquid crystalline polyester composition gives a molded product having high flowability, less variation in flowability, high metal adhesion and reduced warpage during reflow process. The liquid crystalline polyester composition is favorably used for thin-wall electric and electronic components or mechanical components in complicated shapes and is especially useful for metal composite molded products.

DESCRIPTION OF SYMBOLS

Figure 1:
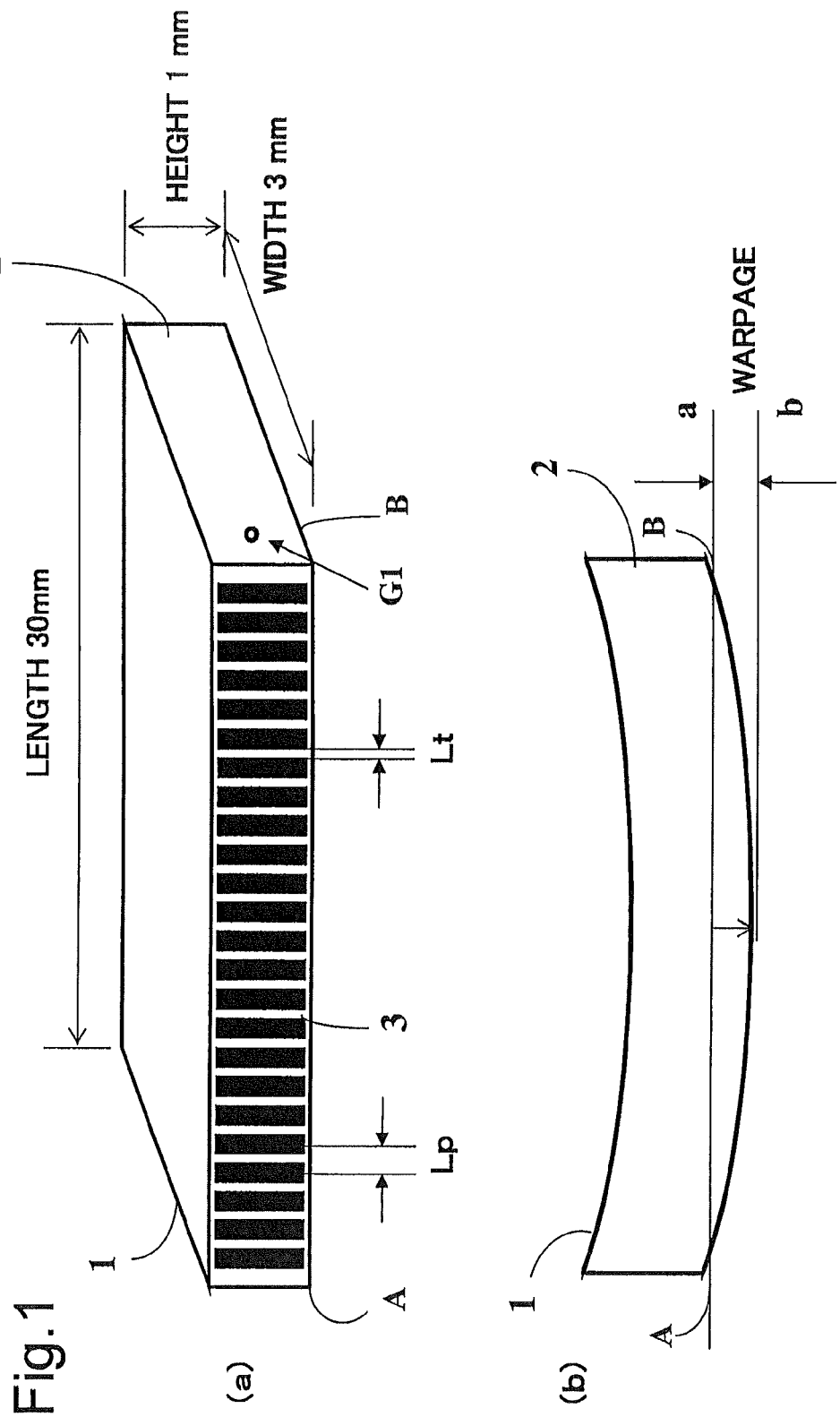
FIG. 1 is a perspective view of a molded connector product manufactured in Examples and a conceptual view showing a measurement site for warpage.

1 Molded Connector Product
2 Shorter Surface
3 Partition Wall
G1 Pin Gate
a Reference Plane (A-B Plane)
b Maximum Deformed Surface
Lp Inter-Terminal Pitch
Lt Minimum Wall Thickness
A Line Connecting Both Ends in Longitudinal Direction
B Line Connecting Both Ends in Shorter Direction

DETAILED DESCRIPTION

The liquid crystalline polyester composition contains 10 to 100 parts by weight of talc having a ratio of oil absorption to specific surface area in a specific range relative to 100 parts by weight of liquid crystalline polyester.

The liquid crystalline polyester has structural units selected from the group including, for example, aromatic oxycarbonyl unit, aromatic and/or aliphatic dioxy units, and aromatic and/or aliphatic dicarbonyl units and forms an anisotropic molten phase.

The aromatic oxycarbonyl unit may be structural unit derived from, for example, p-hydroxybenzoic acid or 6-hydroxy-2-naphthoic acid, and p-hydroxybenzoic acid is preferable. The aromatic and/or aliphatic dioxy unit may be structural unit derived from, for example, 4,4'-dihydroxybiphenyl, hydroquinone, 3,3',5,5'-tetramethyl-4,4'-dihydroxybiphenyl, t-butyl hydroquinone, phenyl hydroquinone, 2,6-dihydroxynaphthalene, 2,7-dihydroxynaphthalene, 2,2-bis(4-hydroxyphenyl)propane, 4,4'-dihydroxydiphenyl ether, ethylene glycol, 1,3-propylene glycol or 1,4-butanediol, and 4,4'-dihydroxybiphenyl and hydroquinone are preferable. The aromatic and/or aliphatic dicarbonyl unit may be structural unit derived from, for example, terephthalic acid, isophthalic acid, 2,6-naphthalenedicarboxylic acid, 4,4'-diphenyldicarboxylic acid, 1,2-bis(phenoxy)ethane-4,4'-dicarboxylic acid, 1,2-bis(2-chlorophenoxy)ethane-4,4'-dicarboxylic acid, 4,4'-diphenyl ether dicarboxylic acid, adipic acid or sebacic acid, and terephthalic acid and isophthalic acid are preferable.

Concrete examples of the liquid crystalline polyester include: liquid crystalline polyester having structural unit derived from p-hydroxybenzoic acid and 6-hydroxy-2-naphthoic acid; liquid crystalline polyester having structural unit derived from p-hydroxybenzoic acid, structural unit derived from 6-hydroxy-2-naphthoic acid and structural unit derived from an aromatic dihydroxy compound, an aromatic dicarboxylic acid and/or an aliphatic dicarboxylic acid; liquid crystalline polyester having structural unit derived from p-hydroxybenzoic acid, structural unit derived from 4,4'-dihydroxybiphenyl and structural unit derived from an aromatic dicarboxylic acid, such as terephthalic acid or isophthalic acid and/or an aliphatic dicarboxylic acid, such as adipic acid or sebacic acid; liquid crystalline polyester having structural unit derived from p-hydroxybenzoic acid, structural unit derived from 4,4'-dihydroxybiphenyl, structural unit derived from hydroquinone and structural unit derived from an aromatic dicarboxylic acid, such as terephthalic acid or isophthalic acid and/or an aliphatic dicarboxylic acid, such as adipic acid or sebacic acid; liquid crystalline polyester having structural unit derived from p-hydroxybenzoic acid, structural unit derived from ethylene glycol and structural unit derived from terephthalic acid and/or isophthalic acid; liquid crystalline polyester having structural unit derived from p-hydroxybenzoic acid, structural unit derived from ethylene glycol, structural unit derived from 4,4'-dihydroxybiphenyl and structural unit derived from terephthalic acid and/or an aliphatic dicarboxylic acid, such as adipic acid or sebacic acid; liquid crystalline polyester having structural unit derived from p-hydroxybenzoic acid, structural unit derived from ethylene glycol, structural unit derived from an aromatic dihydroxy compound and structural unit derived from an aromatic dicarboxylic acid, such as terephthalic acid, isophthalic acid, or 2,6-naphthalenedicarboxylic acid; and liquid crystalline polyester having structural unit derived from 6-hydroxy-2-naphthoic acid, structural unit device from 4,4'-dihydroxybiphenyl and structural unit derived from 2,6-naphthalenedicarboxylic acid.

Among these liquid crystalline polyesters, liquid crystalline polyester having structural units (I), (II), (III), (IV) and (V) shown below is preferable. This liquid crystalline polyester has less gas evolution during molding, thus further improving the metal adhesion. Using this liquid crystalline polyester, in combination with the production method described later enables the shape of talc in the liquid crystalline polyester composition to be more readily controlled to a desired range:

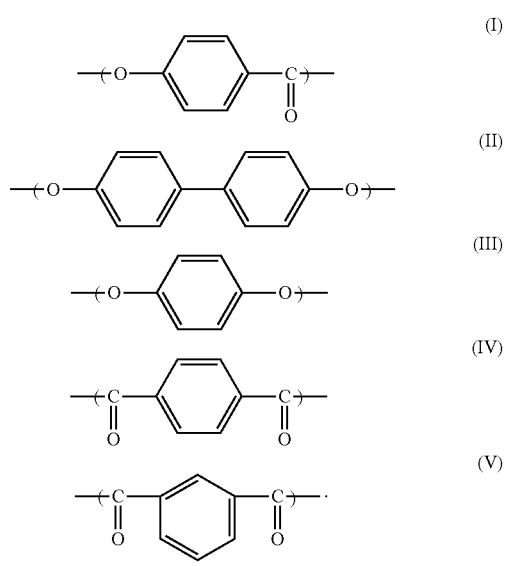

The structural unit (I) represents p-hydroxybenzoic acid-derived structural unit; the structural unit (II) represents 4,4'-dihydroxybiphenyl-derived structural unit; the structural unit (III) represents hydroquinone-derived structural unit; the structural unit (IV) represents terephthalic acid-derived structural unit; and the structural unit (V) represents isophthalic acid-derived structural unit.

The content of the structural unit (I) is preferably 65 to 80 mole percent relative to the total amount of the structural units (I), (II) and (III). Specifically for the improved wettability with the glass fiber, the content of the structural unit (I) is more preferably 68 to 78 mole percent.

The content of the structural unit (II) is preferably 55 to 85 mole percent relative to the total amount of the structural units (II) and (III). Specifically for the improved dimensional stability and the further improved metal adhesion, the content of the structural unit (II) is more preferably 55 to 78 mole percent and most preferably 58 to 73 mole percent.

The content of the structural unit (IV) is preferably 50 to 95 mole percent relative to the total amount of the structural units (IV) and (V). Specifically for the improved dimensional stability and the further improved metal adhesion, the content of the structural unit (IV) is more preferably 55 to 90 mole percent and most preferably 60 to 85 mole percent.

The total amount of the structural units (II) and (III) is preferably equimolar with the total amount of the structural units (IV) and (V). The term "substantially equimolar" herein means that the structural units forming the polymer main chain except the terminal groups are equimolar. Even the non-equimolar composition when including the structural units of the terminal groups may accordingly satisfy the "substantially equimolar" condition. An excess of dicarboxylic acid component or dihydroxy component may be added to control the polymer terminal groups.

The liquid crystalline polyester may be produced by a known polyester polycondensation method. For example, the following production methods are preferably employed:

(1) method of producing the liquid crystalline polyester by deacetylation polycondensation reaction from p-acetoxybenzoic acid, 4,4'-diacetoxybiphenyl, diacetoxybenzene, terephthalic acid and isophthalic acid;

(2) method of producing the liquid crystalline polyester by deacetylation polycondensation reaction after acylation of phenolic hydroxyl group by reaction of acetic anhydride with p-hydroxybenzoic acid, 4,4'-dihydroxybiphenyl, hydroquinone, terephthalic acid and isophthalic acid;

(3) method of producing the liquid crystalline polyester by dephenolation polycondensation reaction from phenyl p-hydroxybenzoate, 4,4'-dihydroxybiphenyl, hydroquinone, diphenyl terephthalate and diphenyl isophthalate; and (4) method of producing the liquid crystalline polyester by dephenolation polycondensation reaction with addition of aromatic dihydroxy compounds, such as 4,4'-dihydroxybiphenyl and hydroquinone after diphenyl esterification by reaction of specified amounts of diphenyl carbonate with p-hydroxybenzoic acid and aromatic dicarboxylic acids, such as terephthalic acid and isophthalic acid.

In the process of producing the liquid crystalline polyester by deacetylation polycondensation reaction, the melt polymerization method is preferably employed to complete the polycondensation reaction under reduced pressure at a temperature at which the liquid crystalline polyester melts. For example, specified amounts of p-hydroxybenzoic acid, 4,4'-dihydroxybiphenyl, hydroquinone, terephthalic acid, isophthalic acid and acetic anhydride are mixed in a reaction vessel and is heated with stirring in nitrogen atmosphere for acetylation of the hydroxyl group. The temperature of the reaction mixture is then further raised to the melting temperature of the liquid crystalline polyester, and the polycondensation reaction is completed under reduced pressure. The reaction vessel may be equipped with stirring blades, may be equipped with a distillation pipe, and may be equipped with an outlet in its bottom portion.

At a temperature at which the resulting polymer melts, the reaction vessel may be pressurized to, for example, about 1.0 kg/cm$^2$ (0.1 MPa), and the resulting polymer may be discharged in the form of strands from the lower outlet of the reaction vessel. The melt polymerization method is advantageous to produce the homogeneous polymer and preferably gives the excellent polymer with less gas evolution.

The polycondensation reaction of the liquid crystalline polyester proceeds without a catalyst, but a metal compound, such as tin (II) acetate, tetrabutyl titanate, potassium acetate, sodium acetate, antimony trioxide, and metal magnesium may be used as the catalyst.

The contents of the respective structural units are calculable from an area ratio of peaks corresponding to the respective structural units by $^1$H-NMR spectroscopy, in which the liquid crystalline polyester is weighed in an NMR (nuclear magnetic resonance) sample tube and is dissolved in a liquid crystalline polyester-soluble solvent (for example, pentafluorophenol/tetrachloroethane-d$_2$ mixture).

The melting point (Tm) is determinable with a differential scanning calorimeter. After observation of an endothermic peak temperature (Tm1) in measurement with heating the liquid crystalline polyester at a rate of 40° C./minute from room temperature, the temperature is sequentially maintained at Tm1+20° C. for 5 minutes, then decreased to room temperature at a rate of 20° C./minute, and increased again at a rate of 20° C./minute. An endothermic peak temperature (Tm2) observed during the re-heating process is determined as the melting point (Tm).

The melt viscosity of the liquid crystalline polyester is preferably 1 to 200 Pa·s, more preferably 10 to 200 Pa·s and further more preferably 10 to 100 Pa·s. The melt viscosity is measured with a Koka-type flow tester (constant-load orifice-type flow tester) at a shear rate of 1000/second under the temperature condition of the melting point of the liquid crystalline polyester+10° C.

The liquid crystalline polyester composition may contain 10 to 100 parts by weight of talc relative to 100 parts by weight of the liquid crystalline polyester. The talc content of less than 10 parts by weight significantly reduces the warpage-control effect and thereby increases the warpage of the resulting molded product. The talc content of less than 10 parts by weight also increases the anisotropy of the molded product, thus reducing the dimensional stability and reducing the metal adhesion. The talc content is preferably not less than 20 parts by weight and is more preferably not less than 30 parts by weight. The talc content of greater than 100 parts by weight, on the other hand, lowers the flowability and increases the pressure required for molding, thus increasing the residual stress in the molded product and increasing the warpage during reflow process. The talc content of greater than 100 parts by weight also causes the poor surface smoothness of the molded product and thereby reduces the metal adhesion. The talc content is preferably not greater than 85 parts by weight and is more preferably not greater than 75 parts by weight.

It is important that the talc contained in the liquid crystalline polyester composition has a ratio (a1/a2) of oil absorption (a1) ml/100 g to specific surface area (a2) m$^2$/g in a range of 14.0 to 26.0 (ml·g)/(100 g·m$^2$). The ratio (a1/a2) shows the oil absorption per specific surface area, and the greater ratio indicates the higher affinity to the liquid crystalline polyester. The ratio (a1/a2) of less than 14.0 (ml·g)/(100 g·m$^2$) lowers the dispersibility of talc and increases the anisotropy of the molded product, which results in increasing the mold shrinkage and reducing the metal adhesion. The ratio (a1/a2) is preferably not less than 16.0 and is more preferably not less than 18.0. The ratio (a1/a2) of greater than 26.0, on the other hand, increases the friction between the liquid crystalline polyester and the talc to increase the variation in flowability. The ratio (a1/a2) is preferably not greater than 24.0 and is more preferably not greater than 22.0.

From the standpoint of further improving the dispersibility of talc, reducing the anisotropy of the molded product, and further increasing the metal adhesion, the oil absorption (a1) of talc contained in the liquid crystalline polyester composition is preferably not less than 20 ml/100 g, more preferably not less than 23 ml/100 g and further more preferably not less than 27 ml/100 g. From the standpoint of reducing the friction between the liquid crystalline polyester and the talc and further increasing the flowability, on the other hand, the oil absorption (a1) of talc is preferably not greater than 40 ml/100 g, more preferably not greater than 37 ml/100 g and further more preferably not greater than 33 ml/100 g.

From the standpoint of further improving the dispersibility of talc, reducing the anisotropy of the molded product and increasing the metal adhesion, the specific surface area (a2) of talc contained in the liquid crystalline polyester composition is preferably not less than 0.9 m$^2$/g, more preferably not less than 1.1 m$^2$/g and further more preferably not less than 1.3 m$^2$/g. From the standpoint of reducing the agglomeration of talc and further reducing the variation in flowability, on the other hand, the specific surface area (a2) of talc is preferably not greater than 1.8 m$^2$/g, more preferably not greater than 1.7 m$^2$/g and further more preferably not greater than 1.6 m$^2$/g.

From the standpoint of further reducing the warpage of the molded product, the number-average particle diameter of the talc contained in the liquid crystalline polyester composition is preferably not less than 10 μm, more preferably not less than 13 μM and further more preferably not less than 15 μm.

From the standpoint of maintaining the thin-wall flowability and reducing hesitation during molding to improve the molding stability, the number-average particle diameter of talc is preferably not greater than 30 μm, more preferably not greater than 25 μm and further more preferably not greater than 20 μm.

With respect to the talc contained in the liquid crystalline polyester composition, the residue on 45-micron sieve is preferably not greater than 1.0 percent by weight relative to the total amount of talc contained in the composition. The residue on 45-micron sieve of not greater than 1.0 percent by weight relative to the total amount of talc contained in the composition prevents clogging in the thin-wall portion during molding, thus improving the molding stability and further reducing the variation in flowability. The residue on 45-micron sieve is preferably not greater than 0.8 percent by weight and more preferably not greater than 0.6 percent by weight relative to the total amount of talc contained in the composition.

The oil absorption (a1), the specific surface area (a2), its ratio (a1/a2), the number-average particle diameter and the residue on 45-micron sieve of the talc contained in the liquid crystalline polyester composition are determinable by the following procedures. The talc is taken out by heating 50 grams of the resin composition at 550° C. for 3 hours for removal of the resin component. When glass fiber is additionally contained in the resin composition, the mixture of talc and glass fiber is taken out, is dispersed in a mixed solution of 88 percent by volume of 1,1,2,2-tetrabromoethane (specific gravity of 2.970) and 12 percent by volume of ethanol (specific gravity of 0.789), and is allowed to stand still for 1 hour. The floating glass fibers are removed by decantation, and the talc deposit is taken out by filtration. The oil absorption (a1) of the obtained talc is measured in conformity with JIS K-5101 (established on Feb. 20, 2004). The specific surface area (a2) is measured with a specific surface area meter SS-100 manufactured by Shimadzu Corporation by air permeability method. The number-average particle diameter is measured using 100 mg of talc weighed and dispersed in water with a laser diffraction/scattering particle size analyzer (LA-300 manufactured by HORIBA, Ltd.). The residue on 45-micron sieve is measured in conformity with JIS K-5101 (established on Feb. 20, 2004).

The talc may be produced by pulverization with a micron mill, Loesche mill or a jet mill.

With the aim of improving the wettability of the talc and the liquid crystalline polyester, the surface of the talc may be treated with, for example, a silane coupling agent. The heat-treated talc may be used with an aim to remove the impurities and harden the talc. The compressed talc may also be used for with the aim of the better handling.

The liquid crystalline polyester composition may additionally contain (C) glass fiber. Adding the glass fiber slightly lowers the flowability, but enables the molded product obtained from the liquid crystalline polyester composition to have the greater warpage control effect, so as to more effectively reduce the warpage during the reflow process. The glass fiber has the higher hardness than the talc so that adding the glass fiber increases the surface hardness of the resulting molded product. This accordingly reduces the potential breakage by an impact applied to the molded product.

The content of the glass fiber is preferably 10 to 100 parts by weight relative to 100 parts by weight of the liquid crystalline polyester. The glass fiber content of not less than 10 parts by weight significantly improves the surface hardness. The content of the glass fiber is preferably not less than 20 parts by weight and is more preferably not less than 30 parts by weight. The glass fiber content of not greater than 100 parts by weight, on the other hand, maintains the high flowability of the liquid crystalline polyester. The content of the glass fiber is preferably not greater than 85 parts by weight and is more preferably not greater than 75 parts by weight.

In the composition additionally containing the glass fiber, a ratio (g/t) of content of glass fiber (g) to content of talc (t) is preferably in the range of 0.3 to 1.5. The ratio (g/t) in the range of 0.3 to 0.6 significantly improves the metal adhesion. The ratio (g/t) in the range of 1.1 to 1.3, on the other hand, significantly improves the surface hardness.

The number-average fiber length of the glass fiber contained in the liquid crystalline polyester composition is preferably not less than 30 μm to improve the surface hardness of the molded product obtained from the liquid crystalline polyester composition. The number-average fiber length of the glass fiber is preferably not less than 60 μm and is more preferably not less than 100 μm. From the standpoint of improving the flowability of the liquid crystalline polyester composition, on the other hand, the number-average fiber length of the glass fiber is preferably not greater than 500 μm, more preferably not greater than 450 μm and further more preferably not greater than 400 μm.

The insufficient dispersion of the glass fiber decreases the surface hardness of the molded product. With an aim to improve the dispersibility of the glass fiber, it is effective to increase the screw rotation speed or to decrease the cylinder temperature, so as to increase the melt viscosity of the molten resin and increase the shear force during melt-kneading with the resin. With an aim to improve the compatibility with the resin, it is effective to apply a coupling agent on the glass fiber.

The number-average fiber length of the glass fiber contained in the liquid crystalline polyester composition is determinable by the following procedure. The mixture of talc and glass fiber included in the liquid crystalline polyester composition is taken out by heating the resin composition at 550° C. for 3 hours for removal of the resin component. The mixture is dispersed in a mixed solution of 88 percent by volume of 1,1,2,2-tetrabromoethane (specific gravity of 2.970) and 12 percent by volume of ethanol (specific gravity of 0.789) and is centrifuged at 10000 rpm for 5 minutes. The floating glass fibers are separated by decantation, and the glass fibers are then separated from the solvent by filtration. The glass fibers are spread in a single layer on a microscope slide, and a micrograph of the glass fibers is taken at 800-fold magnification. The fiber lengths of at least 500 glass fibers selected at random in the micrograph are measured, and their number-average value is calculated.

The content of the glass fiber is preferably 10 to 100 parts by weight relative to 100 parts by weight of the liquid crystalline polyester. The glass fiber content of not less than 10 parts by weight preferably increases the surface hardness of the molded product. The content of the glass fiber is preferably not less than 20 parts by weight and is more preferably not less than 30 parts by weight. The glass fiber content of not greater than 100 parts by weight maintains the high flowability of the liquid crystalline polyester and the high metal adhesion. The content of the glass fiber is preferably not greater than 75 parts by weight and is more preferably not greater than 50 parts by weight.

The liquid crystalline polyester composition may contain fibrous filler other than the glass fiber or another type of filler other than the fibrous filler in a specific range that does not damage our compositions and products. The fibrous filler may be, for example, carbon fiber, aromatic polyamide fiber, potassium titanium fiber, plaster fiber, brass fiber, stainless steel fiber, steel fiber, ceramic fiber, boron whisker fiber or asbestos fiber. Another type of filler other than the fibrous filler may be the powdery, granular or plate-like inorganic filler, such as mica, graphite, calcium carbonate, glass bead, glass microballoon, clay, wollastonite, titanium oxide or molybdenum disulfide. Two or more of these fillers may be used in combination.

The liquid crystalline polyester composition may additionally contain any of the following general additives: antioxidants and heat stabilizers (e.g., hindered phenol, hydroquinone, phosphites and their substitutes), UV absorbers (e.g., resorcinol and salicylate, benzotriazole and benzophenone), lubricants and mold release agents (e.g., montanic acid and its salts, its esters and its half esters, stearyl alcohol, stearamide and polyethylene wax), coloring agents including dyes (e.g., Nitrosine) and pigments (e.g., cadmium sulfide, phthalocyanine and carbon black), plasticizers and antistatic agents. The liquid crystalline polyester composition may additionally contain other thermoplastic resins. Adding any of such additives in a specific range that does not damage the specific properties.

The liquid crystalline polyester composition may be obtained, for example, by melt-kneading the liquid crystalline polyester, the talc and the other components such as glass fiber as needed basis. For example, any of a Banbury mixer, a rubber roller, a kneader, a single-screw extruder and a twin-screw extruder may be used for melt-kneading. The temperature of melt-kneading is preferably 200 to 350° C. To knead the talc homogeneously with high dispersibility, the extruder is preferable, the twin-screw extruder is more preferable, and the twin-screw extruder with an intermediate supply port is further more preferable.

The following methods may be employed to control the oil absorption, the specific surface area, the number-average particle diameter and the residue on 45-micron sieve of the talc contained in the liquid crystalline polyester composition to the desired ranges described above. For example, one available method may supply the talc from an intermediate supply port located upstream from the middle of the overall length from a supply port located on the extruder drive system side to a nozzle for polymer discharge. Another available method may supply part of the talc premixed with the liquid crystalline polyester from the supply port located on the extruder drive system side and supply the residual talc from the intermediate supply port.

In the case of melt-kneading the liquid crystalline polyester, the talc and the other components as needed basis with the extruder, the content of the talc of greater than 65 parts by weight relative to 100 parts by weight of the liquid crystalline polyester tends to increase the friction between the talc in the extruder and thereby increase the degree of breakage of talc. The shape of the talc contained in the liquid crystalline polyester composition may be readily controlled to the above desired range by, for example, decreasing the screw rotation speed or raising the cylinder temperature.

The content of the talc of less than 20 parts by weight relative to 100 parts by weight of the liquid crystalline polyester, on the other hand, tends to decrease the friction between the talc and thereby decrease the degree of breakage of talc. The shape of the talc contained in the liquid crystalline polyester composition may be readily controlled to the above desired range by, for example, increasing the screw rotation speed or lowering the cylinder temperature.

Other available methods to control the shape of the talc contained in the liquid crystalline polyester composition to the above desired range include a method of adjusting the degree of breakage of talc by screw arrangement and a method of adjusting the degree of breakage of talc by controlling the shear force applied to the talc. The shear force may be controlled, for example, by adjusting the screw rotation speed or the cylinder temperature to regulate the melt viscosity of the molten resin.

The following methods may be employed to control the number-average fiber length of the glass fiber contained in the liquid crystalline polyester composition to the above desired range. For example, one available method may blend glass fibers of different fiber lengths and supply the blended glass fibers to the extruder. Another available method may supply one type of such glass fibers together with the liquid crystalline polyester from the supply port located on the extruder drive system side, while supplying the other type of the glass fibers from the intermediate supply port. The glass fibers of different fiber lengths may be, for example, a combination of milled fiber and glass fiber and more specifically a combination of the milled fiber having the number-average fiber length of 30 to 80 μm and the chopped strand having the number-average cut length of 3 to 4 mm.

Another available method may blend pellets of the liquid crystalline polyester composition containing the milled fibers with pellets of the liquid crystalline polyester composition filled with the chopped strand glass fibers and supply the blended pellets to the extruder. Yet another available method may supply one type of such pellets together with the liquid crystalline polyester from the supply port located on the extruder drive system side, while supplying the other type of the pellets from the intermediate supply port.

Other available methods include a method of adjusting the degree of breakage of glass fiber by screw arrangement and a method of adjusting the degree of breakage of glass fiber by controlling the shear force applied to the glass fiber. The shear force may be controlled, for example, by adjusting the screw rotation speed or the cylinder temperature to regulate the melt viscosity of the molten resin.

The contents of the talc, the glass fiber and the other additives contained in the liquid crystalline polyester composition obtained by the above process are generally equal to the amounts added for production of the liquid crystalline polyester composition.

The liquid crystalline polyester composition may be formed to various molded products by any of known molding methods. Injection molding the liquid crystalline polyester composition is especially preferable, because of its excellent thin-wall flowability.

The resulting molded product has the excellent metal adhesion and the less warpage and is thus favorably used for composite molded products with metals. The metal composite molded product has a resin part obtained by injection molding the resin composition and a metal part joined thereto. The metal part is used for conductive parts, such as terminals of electric and electronic components, coils, motors and various sensors. The metal used for the metal part is preferably copper, silver, gold, aluminum or any of these alloys, because of their excellent workability, corrosion resistance, thermal conductivity and electric conductivity.

The metal composite molded product may be used, for example, for electric and electronic components, such as various gears, various casings, sensors, LED components, liquid crystal backlight bobbins, connectors, sockets, resistors, relay cases, relay spools and bases, switches, coil bobbins, capacitors, variable capacitor cases, optical pickups, oscillators, various terminal strips and boards, transformers, plugs, printed circuit boards, tuners, speakers, microphones, headphones, small motors, magnetic head bases, power modules, housings, semiconductors, liquid crystal display components, FDD carriages, FDD chassis, HDD components, motor brush holders, parabola antennas, and computer components; domestic and office electric appliance components, such as video tape recorder components, TV set components (plasma, organic EL and liquid crystal), irons, hair dryers, rice cooker components, microwave oven components, acoustic components, audio equipment components for audios, laserdiscs and compact disks, lighting components, refrigerator components, and air conditioner components; optical equipment and precision machine components, such as office computer components, telephone components, facsimile components, copy machine components, cleaning jigs, various bearings including oilless bearings, stern bearings and submerged bearings, motor components, machine components for lighters and typewriters, microscopes, binoculars, cameras and watches; and automobile and vehicle components, such as alternator terminals, alternator connectors, IC regulators, potentiometer bases for light dimmers, various valves including emission valves, various pipes for fuel, exhaust system, and air intake system, air intake nozzle snorkels, intake manifolds, fuel pumps, engine coolant joints, carburetor main bodies, carburetor spacers, emission sensors, coolant sensors, oil temperature sensors, throttle position sensors, crankshaft position sensors, air flowmeters, brake pad wear sensors, thermostat bases for air conditioners, motor insulators for air conditioners, hot air flow control valves, brush holders for radiator motors, water pump impellers, turbine vanes, wiper motor components, distributors, starter switches, starter relays, transmission wire harnesses, windshield washer fluid nozzles, air conditioner panel switch plates, fuel solenoid valve coils, fuse connectors, ECU connectors, horn terminals, electric component insulators, step motor rotors, lamp sockets, lamp reflectors, lamp housings, brake pistons, solenoid bobbins, engine oil filters and ignition cases. Film applications include films for magnetic recording media. Sheet applications include door trim, shock-absorbing materials for the bumper and the side frame, seat materials, pillars, fuel tanks, brake hoses, windshield washer fluid nozzles and air conditioner refrigerant tubes. Because of its excellent surface appearance, the metal composite molded product is favorably applicable to slide components, such as camera module components, optical pickup lens holders and auto focus camera lens modules.

Among the above applications, the molded product having the less warpage during reflow process and the excellent metal adhesion is favorably used for connectors in lead-free soldering and is especially favorable for various connectors including printed circuit board connectors such as board-to-board connectors, board-to-wire connectors, board-to-board connectors, board-to-FPC connectors and board-to-FFC connectors, card connectors, round connectors, square connectors, vehicle connectors, electric connectors such as coaxial connectors and high-frequency connectors, optical connectors and composite connectors. The molded product is also favorably used for relay components, such as relay cases, relay spools and bases and is especially favorable for power relays, I/O relays, clean relays, latching relays, ratchet relays, solid-state relays and printed circuit board relays.

The molded product is not restricted to the metal composite molded products described above but is effectively useful for film applications, such as photo films, capacitor films, electrical insulating films, wrapping films, drawing films, and ribbon films and sheet applications, such as car interior ceiling, pad materials for the instrument panel and sound absorbing pads for the hood back.

EXAMPLES

The advantageous effects are described more in detail with reference to examples.

The composition analysis and the property evaluation of the liquid crystalline polyester were performed by the following methods:

(1) Composition Analysis of Liquid Crystalline Polyester

Composition analysis of the liquid crystalline polyester was performed by $^1$H-nuclear magnetic resonance spectroscopy ($^1$H-NMR). The liquid crystalline polyester of 50 mg was weighed in an NMR sample tube, was dissolved in 800 μl of a solvent (pentafluorophenol/1,1,2,2,-tetrachloroethane-$d_2$=65/35 w/w % mixture), and was subjected to $^1$H-NMR spectroscopy under the conditions of the spectral frequency of 500 MHz and the temperature of 80° C. with UNITY INOVA 500 NMR spectrometer (manufactured by Varian, Inc). The composition of the liquid crystalline polyester was analyzed from the ratio of the areas of peaks corresponding to the respective structural units observed in the spectral range of 7 to 9.5 ppm.

(2) Measurement of Melting Points (Tm) of Liquid Crystalline Polyester

The melting points (Tm) of the liquid crystalline polyester was measured by differential scanning calorimeter DSC-7 (manufactured by PerkinElmer, Inc). After observation of an endothermic peak temperature (Tm1) in measurement with heating the liquid crystalline polyester at a rate of 40° C./minute from room temperature, the temperature was sequentially maintained at Tm1+20° C. for 5 minutes, then decreased to room temperature at a rate of 20° C./minute, and increased again at a rate of 20° C./minute. An endothermic peak temperature (Tm2) observed during the re-heating process was specified as the melting point (Tm).

(3) Measurement of Melt Viscosity of Liquid Crystalline Polyester

The melt viscosity was measured under the conditions of the temperature set to the melting point of the liquid crystalline polyester+10° C. and the shear rate of 1000/second by Koka-type flow tester CFT-500D (orifice: 0.5ϕ×10 mm) (manufactured by Shimadzu Corporation).

The following shows (A) liquid crystalline polyesters, (B) talcs and (C) glass fibers used in respective Examples and Comparative Examples.

(A) Liquid Crystalline Polyester

Reference Example 1

Synthesis of Liquid Crystalline Polyester (A-1)

In a 5 L reaction vessel with stiffing blades and a distillation pipe, 870 grams (6.30 moles) of p-hydroxybenzoic acid, 327 grams (1.89 moles) of 4,4'-dihydroxybiphenyl, 89 grams (0.81 moles) of hydroquinone, 292 grams (1.76 moles) of terephthalic acid, 157 grams (0.95 moles) of isophthalic acid and 1367 grams of acetic anhydride (1.03 equivalents of the total amount of phenolic hydroxyl group) were mixed, were reacted with stirring in nitrogen atmosphere at 145° C. for 2 hours and were then heated to 320° C. in 4 hours. With keeping the polymerization temperature at 320° C., the reaction vessel was depressurized to 1.0 mmHg (133 Pa) in 1.0 hour and the reaction further proceeded for another 90 minutes. The polycondensation was terminated when the torque required for stiffing reached 15 kg·cm. The reaction vessel was then pressurized to 1.0 kg/cm² (0.1 MPa), and the polymer was formed in strands through nozzles each having a circular outlet of 10 mm in diameter and was pelletized with a cutter to the liquid crystalline polyester (A-1).

The composition analysis was performed for this liquid crystalline polyester (A-1). The liquid crystalline polyester (A-1) had p-oxybenzoate unit (structural unit (I)), 4,4'-dioxybiphenyl unit (structural unit (II)), 1,4-dioxybenzene unit (structural unit (III)), terephthalate unit (structural unit (IV)) and isophthalate unit (structural unit (V)). The liquid crystalline polyester (A-1) contained 70 mole percent of p-oxybenzoate unit (structural unit (I)) relative to the total amount of p-oxybenzoate unit (structural unit (I)), 4,4'-dioxybiphenyl unit (structural unit (II)) and 1,4-dioxybenzene unit (structural unit (III)). The liquid crystalline polyester (A-1) contained 70 mole percent of 4,4'-dioxybiphenyl unit (structural unit (II)) relative to the total amount of 4,4'-dioxybiphenyl unit (structural unit (II)) and 1,4-dioxybenzene unit (structural unit (III)). The liquid crystalline polyester (A-1) contained 65 mole percent of terephthalate unit (structural unit (IV)) relative to the total amount of terephthalate unit (structural unit (IV)) and isophthalate unit (structural unit (V)). The total amount of 4,4'-dioxybiphenyl unit (structural unit (II)) and 1,4-dioxybenzene unit (structural unit (III)) was 23 mole percent relative to the total amount of the structural units. The total amount of terephthalate unit (structural unit (IV)) and isophthalate unit (structural unit (V)) was 23 mole percent relative to the total amount of the structural units. The melting point (Tm) of the liquid crystalline polyester (A-1) was 314° C. The melt viscosity measured at the temperature of 324° C. and the shear rate of 1000/s with the Koka-type flow tester (orifice of 0.5φ×10 mm) was 20 Pa·s.

Reference Example 2

Synthesis of Liquid Crystalline Polyester (A-2)

In a polymerization vessel, 994 grams (7.20 moles) of p-hydroxybenzoic acid, 126 grams (0.68 moles) of 4,4'-dihydroxybiphenyl, 112 grams (0.68 moles) of terephthalic acid, 159 grams (1.13 moles) of polyethylene terephthalate having the intrinsic viscosity of about 0.6 dl/g and 960 grams of acetic anhydride (1.10 equivalents of the total amount of phenolic hydroxyl group) were mixed, were reacted for 3 hours with stirring in nitrogen atmosphere with heating to 150° C. The reaction mixture was subsequently heated from 150° C. to 250° C. in 2 hours and further heated from 250° C. to 330° C. in 1.5 hours, was subjected to pressure reduction to 1.0 mmHg (133 Pa) at 325° C. in 1.5 hours, and was further stirred for 0.25 hours. The polycondensation was terminated when the torque required for stirring reached 12 kg·cm. The reaction vessel was then pressurized to 1.0 kg/cm$^2$ (0.1 MPa), and the polymer was formed in strands through nozzles each having a circular outlet of 10 mm in diameter and was pelletized with a cutter to the liquid crystalline polyester (A-2).

The composition analysis was performed for this liquid crystalline polyester (A-2). The liquid crystalline polyester had 66.7 mole percent of p-oxybenzoate unit (structural unit (I)), 6.3 mole percent of 4,4'-dioxybiphenyl unit (structural unit (II)), 10.4 mole percent of polyethylene terephthalate-derived ethylenedioxy unit and 16.6 mole percent of terephthalate unit (structural unit (IV)). The melting point (Tm) was 314° C. The melt viscosity measured at the temperature of 324° C. and the shear rate of 1000/s with the Koka-type flow tester (orifice of 0.5φ×10 mm) was 25 Pa·s.

Reference Example 3

Synthesis of Liquid Crystalline Polyester (A-3)

According to JP S54-77691A, in a reaction vessel with stirring blades and a distillation pipe, 921 parts by weight of p-acetoxybenzoic acid and 435 parts by weight of 6-acetoxynaphthoic acid were mixed and polycondensated. The resulting liquid crystalline polyester (A-3) had 57 mole equivalents of p-acetoxybenzoic acid-derived structural unit (structural unit (I)) and 22 mole equivalents of 6-acetoxynaphthoic acid-derived structural unit. The melting point (Tm) was 283° C. The melt viscosity measured at the temperature of 293° C. and the shear rate of 1000/s with the Koka-type flow tester (orifice of 0.5 4×10 mm) was 30 Pa·s.

(B) Talc
- (B-1) "PKP-53" manufactured by Fuji Talc Industrial Co., Ltd. (number-average particle diameter: 18.5 μm, residue on 45-micron sieve relative to total amount of talc: 0.5 wt %);
- (B-2) "SWE" manufactured by Nippon Talc Co., Ltd. (number-average particle diameter: 19.0 μm, residue on 45-micron sieve relative to total amount of talc: 0.2 wt %);
- (B-3) "NK-48" manufactured by Fuji Talc Industrial Co., Ltd. (number-average particle diameter: 26.0 μm, residue on 45-micron sieve relative to total amount of talc: 5.0 wt %);
- (B-4) "LMS-200" manufactured by Fuji Talc Industrial Co., Ltd. (number-average particle diameter: 5.0 μm, residue on 45-micron sieve relative to total amount of talc: 0.1 wt % or lower); and
- (B-5) "X-50" manufactured by Nippon Talc Co., Ltd. (number-average particle diameter: 17.4 μm, residue on 45-micron sieve relative to total amount of talc: 0.2 wt %).

(C) Glass Fiber
- (C-1) "chopped strand ECS03 T-747H" manufactured by Nippon Electric Glass Co., Ltd. (number-average fiber length: 3.0 mm, number-average fiber diameter: 10.5 μm); and
- (C-2) "milled fiber EPG70M-01N" manufactured by Nippon Electric Glass Co., Ltd. (number-average fiber length: 70 μm, number-average fiber diameter: 9 μm).

Liquid crystalline polyester compositions of Examples and Comparative Examples were prepared from the liquid crystalline polyester (A), the talc (B) and, if applicable, the glass fiber (C) described above. The properties of the respective liquid crystalline polyester compositions were evaluated by the following procedures.

(1) Warpage

Each of the liquid crystalline resin compositions obtained in respective Examples and Comparative Examples was injection molded by FANUC ROBOSHOT α-30C (manufactured by FANUC Corporation) under the conditions of the cylinder temperature set to the melting point of the liquid crystalline polyester composition+10° C. and the die temperature of 90° C. A connector-type, long molded product (molded connector product 1) continuously molded had inter-terminal pitch (Lp) of 0.5 mm, minimum wall thickness (Lt) (partition walls 3) of 0.1 mm, outside dimensions of 3 mm in width×1 mm in height×30 mm in length, and average wall thickness of 0.2 mm as shown in FIG. 1a. FIG. 1a is a perspective view of the molded connector product 1. The molded product was obtained by charging the liquid crystalline polyester composition from a pin gate G1 (gate diameter of 0.3 mm) located in a single shorter surface 2 of the box-like molded connector product 1 having the inter-terminal pitch of 0.3 mm and the minimum wall thickness of 0.1 mm as the partition walls 3. The warpage of the molded connector product thus obtained was measured by the following procedures.

(Before Reflow Warpage)

The warpage of the molded connector product immediately after molding was measured. A plane connecting both ends of the molded connector product in the longitudinal direction was set as a reference plane, and maximum distance from the reference plane was measured. FIG. 1b is a conceptual view showing measurement site of warpage in the molded connector product. The warpage was given as distance of a maximum deformed surface "b" from an A-B plane as a reference plane "a," where A represents a line connecting both ends in the longitudinal direction and B represents a line connecting both ends in the shorter direction. The warpage of not greater than 0.08 mm was evaluated as "excellent" (double circle); the warpage of greater than 0.08 mm but not greater than 0.15 mm was evaluated as "good" (circle); and the warpage of greater than 0.15 mm was evaluated as "poor" (cross).

(During Reflow Warpage)

Figure 2:
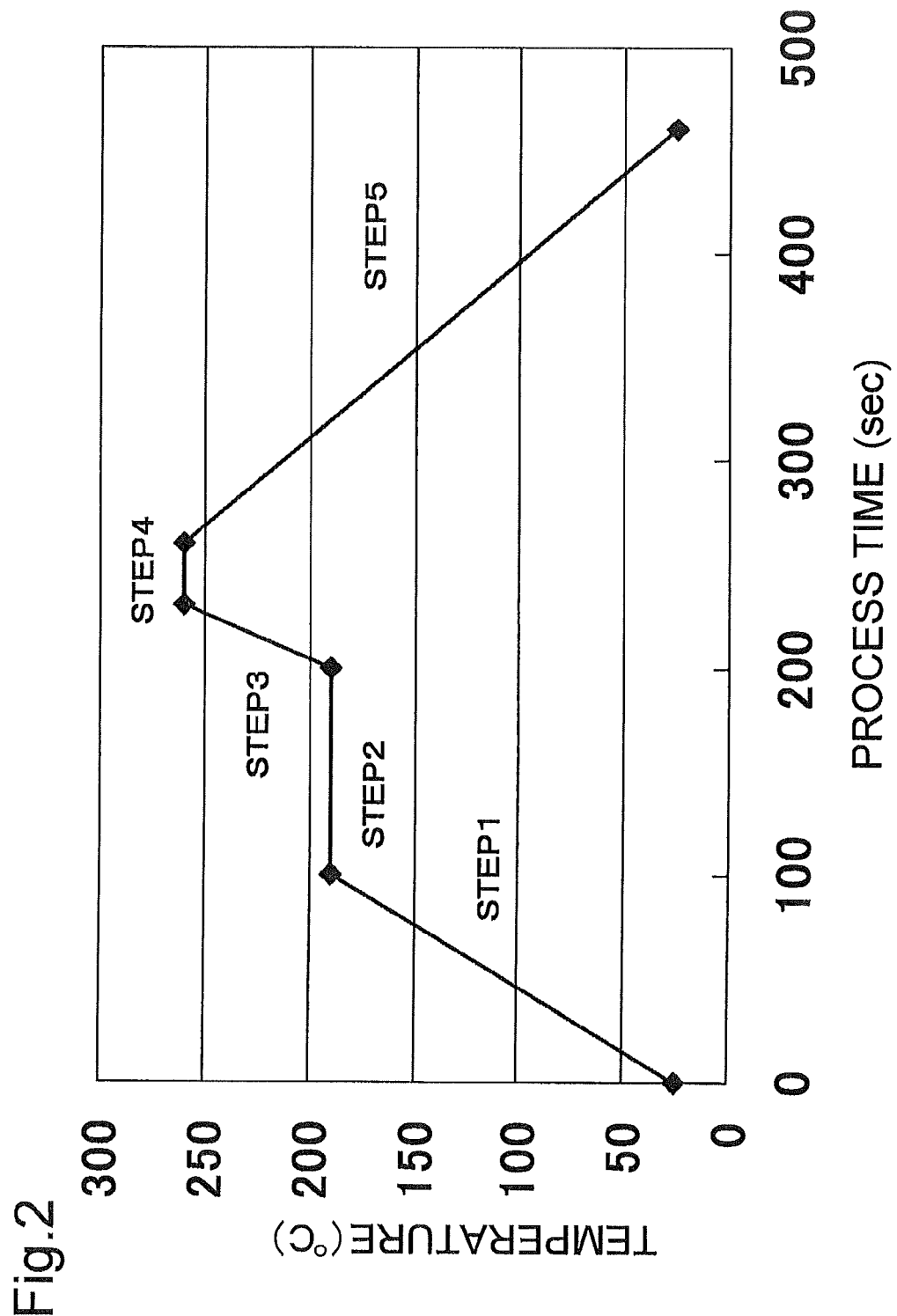
FIG. 2 shows a temperature profile of a reflow simulator used in Examples.

The molded connector product immediately after molding was subjected to reflow process with a reflow simulator according to a temperature profile shown in FIG. 2, and the warpage during the reflow process was similarly measured by the above method.

Temperature Profile:
STEP 1: Raising Temperature from 25° C. to 190° C. in 100 seconds;
STEP 2: Keeping at 190° C. for 100 seconds;
STEP 3: Raising Temperature from 190° C. to 260° C. in 30 seconds;
STEP 4: Keeping at 260° C. for 30 seconds; and
STEP 5: Lowering Temperature from 260° C. to 25° C. in 200 seconds.

The warpage of not greater than 0.20 mm was evaluated as "excellent" (double circle); the warpage of greater than 0.20 mm but not greater than 0.35 mm was evaluated as "good" (circle); and the warpage of greater than 0.35 mm was evaluated as "poor" (cross).

(2) Flowability

Each of the liquid crystalline resin compositions obtained in respective Examples and Comparative Examples was injection molded by FANUC ROBOSHOT α-30C (manufactured by FANUC Corporation) with a die that was capable of simultaneously molding a molded product of 12.7 mm in width×100 mm in length×0.3 mm in thickness and a molded product of 12.7 mm in width×100 mm in length×0.5 mm in thickness. The conditions of the molding were the cylinder temperature set to the melting point Tm of the liquid crystalline polyester+10° C. and the die temperature of 90° C. The flow length in a cavity of 12.7 mm in width×0.3 mm in thickness was measured under the molding condition that a molded product of 12.7 mm in width×0.5 mm in thickness was moldable to the length of 100 mm. Twenty shots of such molding were repeated, and the maximum flow length and the minimum flow length in the cavity of 12.7 mm in width×0.3 mm in thickness among the 20 shots were measured. The smaller difference between the maximum flow length and the minimum flow length indicates the less variation in flowability.

(3) Metal Adhesion

Figure 3:
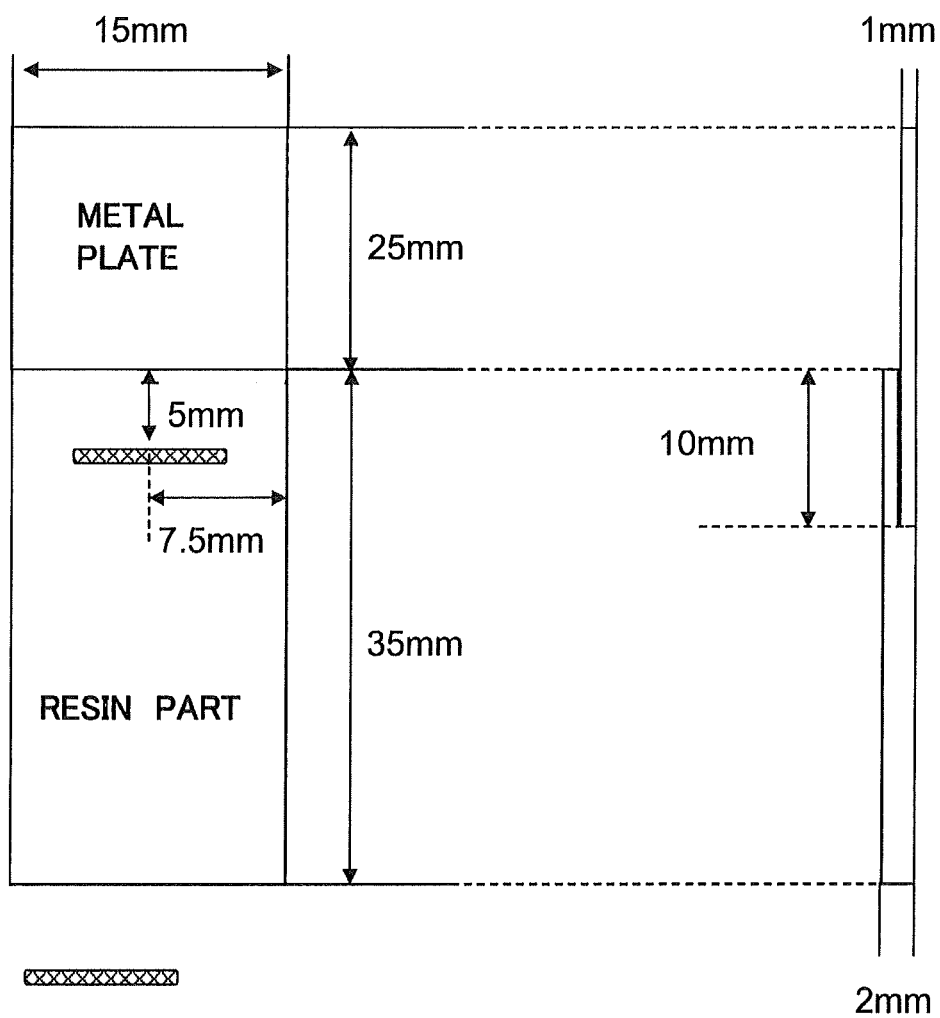
FIG. 3 is a conceptual view showing a test piece for evaluation of metal adhesion used in Examples.

Each of the liquid crystalline resin compositions obtained in respective Examples and Comparative Examples was injection molded to a test piece for evaluation of metal adhesion shown in FIG. 3 by FANUC ROBOSHOT α-30C (manufactured by FANUC Corporation) under the conditions of the cylinder temperature set to the melting point of the liquid crystalline polyester+10° C., the die temperature of 90° C. and the injection speed of 100 mm/s. A metal plate (material: aluminum plate A5052) and the resin part were fixed in a bending tester ("Tensilon®-500" manufactured by ORIENTEC CO., LTD), and the metal adhesion strength was measured at the strain rate of 1 mm/minute. The metal adhesion strength of greater than 40 MPa was evaluated as "excellent metal adhesion" (double circle); the metal adhesion strength of 20 MPa to 40 MPa was evaluated as "good metal adhesion" (circle); and the metal adhesion strength of less than 20 MPa was evaluated as "poor metal adhesion" (cross).

(4) Surface Hardness

Figure 4:
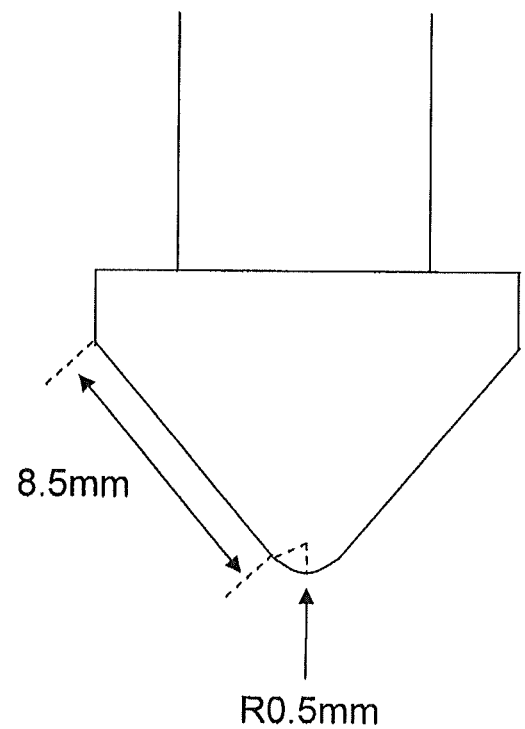
FIG. 4 is a conceptual view showing a jig for evaluation of surface hardness used in Examples.

Each of the liquid crystalline resin compositions obtained in respective Examples and Comparative Examples was injection molded to a square plate of 80 mm in length×80 mm in width×1 mm in thickness by FANUC ROBOSHOT α-30C (manufactured by FANUC Corporation) under the conditions of the cylinder temperature set to the melting point of the liquid crystalline polyester+10° C. and the die temperature of 90° C. The load required for pressing this square plate into the depth of 0.20 mm with a jig of R 0.5 mm shown in FIG. 4. The greater load indicates the higher surface hardness.

The following describes the liquid crystalline polyester compositions of Examples 1 to 9 and Comparative Examples 1 to 6 produced from the liquid crystalline polyester (A) and the talc (B) described above.

Examples 1, 2, 4, 5, 7 to 9 and Comparative Examples 1, 3, 4, 5 and 6

In a TEM35B twin-screw extruder (intermeshed co-rotation) with cylinders C1 (main feeder-side heater) to C7 (die-side heater) manufactured by TOSHIBA MACHINE CO., LTD., an intermediate supply port was placed in the cylinder C3 and a vacuum vent was placed in the cylinder C5. By using a screw arrangement with kneading blocks built in the cylinders C2 and C4, the liquid crystalline polyester (A) shown in Table 1, was added from the main feeder (supply port 1), while the talc (B) was added from the intermediate supply port (supply port 2). The mixture was melt-kneaded at the cylinder temperature set to the melting point of the liquid crystalline polyester+10° C. and the screw rotation speed of 200 rpm, and was then formed to pellets with a strand cutter.

The talc was taken out by heating 50 grams of the obtained pellets at 550° C. for 3 hours for removal of the resin component. The oil absorption (a1) was measured in conformity with JIS K-5101 (established on Feb. 20, 2004). The specific surface area (a2) was measured with a specific surface area meter SS-100 manufactured by Shimadzu Corporation by air permeability method. The number-average particle diameter was measured using 100 mg of talc weighed and dispersed in water with a laser diffraction/scattering particle size analyzer (LA-300 manufactured by HORIBA, Ltd.). The residue on 45-micron sieve was measured in conformity with JIS K-5101 (established on Feb. 20, 2004).

Example 3

In a TEM35B twin-screw extruder (intermeshed co-rotation) with cylinders C1 (main feeder-side heater) to C7 (die-side heater) manufactured by TOSHIBA MACHINE CO., LTD., an intermediate supply port was placed in the cylinder C3 and a vacuum vent was placed in the cylinder C6. By using a screw arrangement with kneading blocks built in the cylinders C2 and C4, the liquid crystalline polyester (A) shown in Table 1, i.e., (A-1), was added from the main feeder (supply port 1), while the talc (B) shown in Table 1 was added from the intermediate supply port (supply port 2). The mixture was melt-kneaded at the cylinder temperature set to the melting point of the liquid crystalline polyester+20° C. and the screw rotation speed of 200 rpm, and was then formed to pellets with a strand cutter. The oil absorption (a1), the specific surface area (a2), the number-average particle diameter and the residue on 45-micron sieve of the talc contained in the liquid crystalline polyester composition were measured by the same procedures as those of Example 1.

Example 6

In a TEM35B twin-screw extruder (intermeshed co-rotation) with cylinders C1 (main feeder-side heater) to C7 (die-side heater) manufactured by TOSHIBA MACHINE CO., LTD., an intermediate supply port was placed in the cylinder C3 and a vacuum vent was placed in the cylinder C6. By using a screw arrangement with kneading blocks built in the cylinders C2 and C4, the dry-blended mixture of the liquid crystalline polyester (A) shown in Table 1, i.e., (A-1), and the talc (B) was added from the main feeder (supply port 1), while the talc (B) shown in Table 1 was added from the intermediate supply port (supply port 2). The mixture was melt-kneaded at the cylinder temperature set to the melting point of the liquid crystalline polyester+10° C. and the screw rotation speed of 200 rpm, and was then formed to pellets with a strand cutter. The oil absorption (a1), the specific surface area (a2), the number-average particle diameter and the residue on 45-micron sieve of the talc contained in the liquid crystalline polyester composition were measured by the same procedures as those of Example 1.

Comparative Example 2

In a TEM35B twin-screw extruder (intermeshed co-rotation) with cylinders C1 (main feeder-side heater) to C7 (die-side heater) manufactured by TOSHIBA MACHINE CO., LTD., an intermediate supply port was placed in the cylinder C4 and a vacuum vent was placed in the cylinder C6. By using a screw arrangement with a kneading block built in the cylinder C3, the liquid crystalline polyester (A) shown in Table 1, i.e., (A-1), was added from the main feeder (supply port 1), while the talc (B) shown in Table 1 was added from the intermediate supply port (supply port 2). The mixture was melt-kneaded at the cylinder temperature set to the melting point of the liquid crystalline polyester+10° C. and the screw rotation speed of 250 rpm, and was then formed to pellets with a strand cutter. The oil absorption (a1), the specific surface area (a2), the number-average particle diameter and the residue on 45-micron sieve of the talc contained in the liquid crystalline polyester composition were measured by the same procedures as those of Example 1.

The compositions and the evaluation results of Examples 1 to 9 and Comparative Examples 1 to 6 are shown in Table 1.

TABLE 1

| | (A) Liquid Crystalline Polyester (100 parts by weight) | (B) Talc Content (parts by weight) | | | | | Talc in Composition | | | | |
|---|---|---|---|---|---|---|---|---|---|---|---|
| | | | | | | | Oil Absorption (a1) | Specific Surface Area (a2) | a1/a2 | Number-Ave. Particle Diameter | Residue on 45-Micron Sieve to Total Amount of Talc in Composition |
| | | B-1 | B-2 | B-3 | B-4 | B-5 | ml/100 g | m²/g | (ml · g)/(100 g · m²) | μm | wt % |
| EX 1 | A-1 | 50 | 0 | 0 | 0 | 0 | 30 | 1.5 | 20.0 | 17.5 | 0.1 |
| EX 2 | A-1 | 35 | 0 | 0 | 0 | 0 | 31 | 1.4 | 21.8 | 18.0 | 0.2 |
| EX 3* | A-1 | 80 | 0 | 0 | 0 | 0 | 30 | 1.4 | 21.4 | 18.5 | 0.2 |
| EX 4 | A-1 | 80 | 0 | 0 | 0 | 0 | 27 | 1.8 | 16.9 | 15.0 | 0.4 |
| EX 5 | A-1 | 25 | 0 | 0 | 0 | 0 | 31 | 1.3 | 23.8 | 18.5 | 0.3 |
| EX 6* | A-1 | 30 (Main Feeder) 50 (Intermediate Supply Port) | 50 | 0 | 0 | 0 | 29 | 1.4 | 20.7 | 21.5 | 0.5 |
| EX 7 | A-1 | 0 | 50 | 0 | 0 | 0 | 31 | 1.4 | 22.1 | 18.5 | 0.2 |
| EX 8 | A-2 | 50 | 0 | 0 | 0 | 0 | 25 | 1.2 | 20.8 | 16.5 | 0.5 |
| EX 9 | A-3 | 50 | 0 | 0 | 0 | 0 | 32 | 1.7 | 18.8 | 15.0 | 0.3 |
| Comp. EX 1 | A-1 | 0 | 0 | 0 | 50 | 0 | 44 | 4.5 | 9.8 | 5.0 | 0.1 |
| Comp. EX 2* | A-1 | 0 | 50 | 0 | 0 | 0 | 17 | 1.4 | 12.1 | 21.5 | 4.8 |
| Comp. EX 3 | A-1 | 150 | 0 | 0 | 0 | 0 | 28 | 3.2 | 8.1 | 9.0 | 0.3 |
| Comp. EX 4 | A-1 | 5 | 0 | 0 | 0 | 0 | 29 | 0.7 | 41.4 | 19.5 | 0.4 |
| Comp. EX 5 | A-1 | 0 | 0 | 50 | 0 | 0 | 28 | 0.9 | 31.1 | 26.0 | 2.8 |
| Comp. EX 6 | A-1 | 0 | 0 | 0 | 0 | 50 | 23 | 0.8 | 28.8 | 11.8 | 0.2 |

TABLE 1-continued

|  | Warpage | | | | Flowability (0.3 mm-Thick Flow Length) | | | Metal Adhesion Metal | |
|---|---|---|---|---|---|---|---|---|---|
|  | Before Reflow | | During Reflow | | Max Flow Length (a) | Min Flow Length (b) | Variation (a) − (b) | Adhesion Strength | |
|  | mm | Eval. | mm | Eval. | mm | mm | mm | MPa | Eval. |
| EX 1 | 0.04 | ◎ | 0.10 | ◎ | 67 | 67 | 0 | 48 | ◎ |
| EX 2 | 0.06 | ◎ | 0.12 | ◎ | 69 | 68 | 1 | 43 | ◎ |
| EX 3* | 0.02 | ◎ | 0.14 | ◎ | 59 | 57 | 2 | 36 | ○ |
| EX 4 | 0.03 | ◎ | 0.23 | ○ | 63 | 60 | 3 | 32 | ○ |
| EX 5 | 0.09 | ○ | 0.16 | ◎ | 71 | 65 | 6 | 37 | ◎ |
| EX 6* | 0.02 | ◎ | 0.24 | ○ | 61 | 53 | 8 | 29 | ◎ |
| EX 7 | 0.07 | ◎ | 0.28 | ○ | 64 | 56 | 8 | 42 | ◎ |
| EX 8 | 0.13 | ○ | 0.20 | ◎ | 66 | 62 | 4 | 28 | ○ |
| EX 9 | 0.14 | ○ | 0.31 | ○ | 60 | 55 | 5 | 26 | ○ |
| Comp. EX 1 | 0.42 | X | 0.62 | X | 53 | 30 | 23 | 18 | X |
| Comp. EX 2* | 0.36 | X | 0.50 | X | 62 | 42 | 20 | 14 | X |
| Comp. EX 3 | 0.28 | X | 0.36 | X | 48 | 32 | 16 | 10 | X |
| Comp. EX 4 | 0.79 | X | 1.81 | X | 73 | 57 | 16 | 17 | X |
| Comp. EX 5 | 0.14 | ○ | 0.38 | X | 62 | 52 | 10 | 27 | ○ |
| Comp. EX 6 | 0.14 | ○ | 0.61 | X | 58 | 51 | 7 | 18 | X |

*Examples of different production methods

As clearly shown in Table 1, compared with the liquid crystalline polyester compositions of Comparative Examples 1 to 6, the liquid crystalline polyester compositions of Examples 1 to 9 of the invention had the more excellent flowability, the less variation in flowability, the more excellent metal adhesion and the reduced warpage before the reflow process and during the reflow process.

The following describes the liquid crystalline polyester compositions of Examples 10 to 17 and Comparative Examples 7 and 8 produced from the liquid crystalline polyester (A), the talc (B) and the glass fiber (C) described above.

Examples 10 to 17 and Comparative Example 7

In a TEM35B twin-screw extruder (intermeshed co-rotation) with cylinders C1 (main feeder-side heater) to C7 (die-side heater) manufactured by TOSHIBA MACHINE CO., LTD., an intermediate supply port was placed in the cylinder C3 and a vacuum vent was placed in the cylinder C5. By using a screw arrangement with kneading blocks built in the cylinders C2 and C4, the liquid crystalline polyester (A) shown in Table 2, was added from the main feeder (supply port 1), while the talc (B) and the glass fiber (C) shown in Table 2 were added from the intermediate supply port (supply port 2). The mixture was melt-kneaded at the cylinder temperature set to the melting point of the liquid crystalline polyester+10° C. and the screw rotation speed of 120 rpm, and was then formed to pellets with a strand cutter.

The mixture of the talc and the glass fiber contained in the liquid crystalline polyester resin was taken out by heating 50 grams of the obtained pellets at 550° C. for 3 hours for removal of the resin component. The mixture was dispersed in a mixed solution of 88 percent by volume of 1,1,2,2-tetrabromoethane (specific gravity of 2.970) and 12 percent by volume of ethanol (specific gravity of 0.789) and was centrifuged at 10000 rpm for 5 minutes. The floating glass fibers were removed by decantation, and the talc deposit was taken out by filtration. The oil absorption (a1) of the obtained talc was measured in conformity with JIS K-5101 (established on Feb. 20, 2004). The specific surface area (a2) was measured with a specific surface area meter SS-100 manufactured by Shimadzu Corporation by air permeability method. The number-average particle diameter was measured using 100 mg of talc weighed and dispersed in water with a laser diffraction/scattering particle size analyzer (LA-300 manufactured by HORIBA, Ltd.). The residue on 45-micron sieve was measured in conformity with JIS K-5101 (established on Feb. 20, 2004). The glass fibers by decantation were separated from the solvent by filtration. The glass fibers were spread in a single layer on a microscope slide, and a micrograph of the glass fibers was taken at 800-fold magnification. The fiber lengths of at least 500 glass fibers selected at random in the micrograph were measured, and their number-average value was calculated.

Comparative Example 8

In a TEM35B twin-screw extruder (intermeshed co-rotation) with cylinders C1 (main feeder-side heater) to C7 (die-side heater) manufactured by TOSHIBA MACHINE CO., LTD., an intermediate supply port was placed in the cylinder C4 and a vacuum vent was placed in the cylinder C6. By using a screw arrangement with a kneading block built in the cylinder C3, the liquid crystalline polyester (A) shown in Table 2, i.e., (A-1), was added from the main feeder (supply port 1), while the talc (B) and the glass fiber (C) shown in Table 2 were added from the intermediate supply port (supply port 2). The mixture was melt-kneaded at the cylinder temperature set to the melting point of the liquid crystalline polyester+10° C. and the screw rotation speed of 120 rpm, and was then formed to pellets with a strand cutter. The oil absorption (a1), the specific surface area (a2), the number-average particle diameter and the residue on 45-micron sieve of the talc contained in the liquid crystalline polyester composition were measured by the same procedures as those of Example 11.

The compositions and the evaluation results of Examples 10 to 17 and Comparative Examples 7 and 8 are shown in Table 2.

TABLE 2

| | | | | | | Talc in Composition | | | | |
|---|---|---|---|---|---|---|---|---|---|---|
| | (A) Liquid Crystalline Polyester (100 parts by weight) | (B) Talc Content (parts by weight) | (C) Glass Fiber Content (parts by weight) | | Oil Absorption (a1) | Specific Surface Area (a2) | a1/a2 | Number-Ave. Particle Diameter | Residue on 45-Micron Sieve to Total Amount of Talc in Composition |
| | | B-1 | C-1 | C-2 | ml/100 g | m²/g | (ml·g)/(100 g·m²) | μm | wt % |
| EX 10 | A-1 | 35 | 40 | 0 | 31 | 1.5 | 20.7 | 16.5 | 0.3 |
| EX 11 | A-1 | 35 | 80 | 0 | 31 | 1.6 | 19.4 | 15.0 | 0.3 |
| EX 12 | A-1 | 35 | 14 | 0 | 28 | 1.4 | 20.0 | 17.2 | 0.3 |
| EX 13 | A-1 | 35 | 35 | 0 | 22 | 1.5 | 14.7 | 18.3 | 0.4 |
| EX 14 | A-1 | 35 | 4 | 0 | 21 | 1.5 | 15.0 | 17.9 | 0.4 |
| EX 15 | A-1 | 35 | 0 | 40 | 27 | 1.4 | 19.3 | 17.0 | 0.4 |
| EX 16 | A-2 | 35 | 40 | 0 | 22 | 1.3 | 16.9 | 15.5 | 0.5 |
| EX 17 | A-3 | 35 | 40 | 0 | 32 | 1.8 | 17.6 | 17.0 | 0.4 |
| Comp. EX 7 | A-1 | 35 | 150 | 0 | 23 | 2.1 | 11.0 | 8.5 | 0.2 |
| Comp. EX 8* | A-1 | 35 | 40 | 0 | 16 | 1.2 | 13.3 | 21.0 | 0.5 |

| | Glass Fiber Number-Ave. Fiber Length | (1)Warpage | | | | Flowability (0.3 mm-Thick Flow Length) | | | Metal Adhesion | | |
| | | Before Reflow | | During Reflow | | Max Flow Length (a) | Min Flow Length (b) | Variation (a) − (b) | Metal Adhesion Strength | | Surface Hardness |
| | μm | mm | Eval. | mm | Eval. | mm | mm | mm | MPa | Eval. | N |
| EX 10 | 330 | 0.05 | ⊚ | 0.08 | ⊚ | 52 | 49 | 3 | 43 | ⊚ | 176 |
| EX 11 | 285 | 0.03 | ⊚ | 0.23 | ○ | 49 | 44 | 5 | 23 | ○ | 225 |
| EX 12 | 377 | 0.07 | ⊚ | 0.21 | ○ | 55 | 49 | 6 | 41 | ⊚ | 145 |
| EX 13 | 354 | 0.06 | ⊚ | 0.27 | ○ | 48 | 41 | 7 | 24 | ○ | 102 |
| EX 14 | 442 | 0.09 | ○ | 0.34 | ○ | 61 | 56 | 5 | 37 | ○ | 61 |
| EX 15 | 72 | 0.14 | ○ | 0.32 | ○ | 58 | 50 | 8 | 35 | ○ | 97 |
| EX 16 | 420 | 0.08 | ⊚ | 0.34 | ○ | 54 | 45 | 9 | 22 | ○ | 153 |
| EX 17 | 380 | 0.06 | ⊚ | 0.33 | ○ | 50 | 44 | 6 | 28 | ○ | 160 |
| Comp. EX 7 | 233 | 0.18 | X | 0.44 | X | 28 | 12 | 16 | 16 | X | 284 |
| Comp. EX 8* | 630 | 0.32 | X | 0.42 | X | 37 | 17 | 20 | 7 | X | 121 |

*Example of different production method

As clearly shown in Table 2, compared with the liquid crystalline polyester compositions of Comparative Examples 7 and 8, the liquid crystalline polyester compositions of Examples 10 to 17 of the invention had the more excellent flowability, the less variation in flowability, the more excellent metal adhesion, the reduced warpage before the reflow process and during the reflow process and the improved surface hardness.

The invention claimed is:

1. A liquid crystalline polyester composition comprising 100 parts by weight of liquid crystalline polyester (A) and 10 to 100 parts by weight of talc (B), wherein
the talc (B) in the composition has a ratio (a1/a2) of oil absorption (a1) ml/100 g to specific surface area (a2) m²/g in a range of 14.0 to 26.0 (ml·g)/(100 g·m²) and has a number-average particle diameter of 10 to 30 μm.

2. The liquid crystalline polyester composition according to claim 1, wherein
the specific surface area (a2) of the talc (B) is 0.9 to 1.8 m²/g.

3. The liquid crystalline polyester composition according to claim 2, wherein
the talc (B) has residue on 45-micron sieve of 1.0 percent by weight or less relative to a total amount of talc contained in the composition.

4. The liquid crystalline polyester composition according to claim 1, wherein
the talc (B) has residue on 45-micron sieve of 1.0 percent by weight or less relative to a total amount of talc contained in the composition.

5. The liquid crystalline polyester composition according to claim 4, further comprising 10 to 100 parts by weight of glass fiber (C), wherein
the glass fiber (C) has a number-average fiber length of 30 to 500 μm.

6. A molded product manufactured by injection molding the liquid crystalline polyester composition according to claim 4.

7. A metal composite molded product comprising the molded product according to claim 6, and having a resin part and a metal part joined to the resin part.

8. A connector or a relay comprising the metal composite molded product according to claim 7.

9. The liquid crystalline polyester composition according to claim 1, further comprising 10 to 100 parts by weight of glass fiber (C), wherein
the glass fiber (C) has a number-average fiber length of 30 to 500 μm.

10. The liquid crystalline polyester composition according to claim 1, wherein
the liquid crystalline polyester (A) has structural units (I), (II), (III), (IV) and (V), wherein
content of the structural unit (I) is 65 to 80 mole percent relative to a total amount of the structural units (I), (II) and (III),
content of the structural unit (II) is 55 to 85 mole percent relative to a total amount of the structural units (II) and (III), and
content of the structural unit (IV) is 50 to 95 mole percent relative to a total amount of the structural units (IV) and (V):

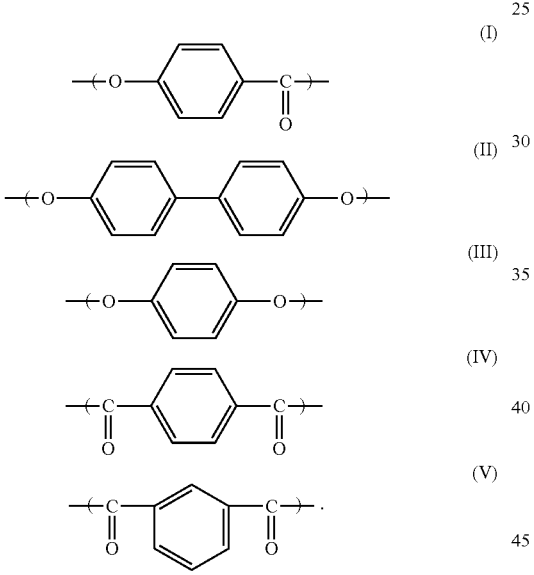

11. The liquid crystalline polyester composition according to claim 4, wherein
the liquid crystalline polyester (A) has structural units (I), (II), (III), (IV) and (V), wherein
content of the structural unit (I) is 65 to 80 mole percent relative to a total amount of the structural units (I), (II) and (III),
content of the structural unit (II) is 55 to 85 mole percent relative to a total amount of the structural units (II) and (III), and
content of the structural unit (IV) is 50 to 95 mole percent relative to a total amount of the structural units (IV) and (V):

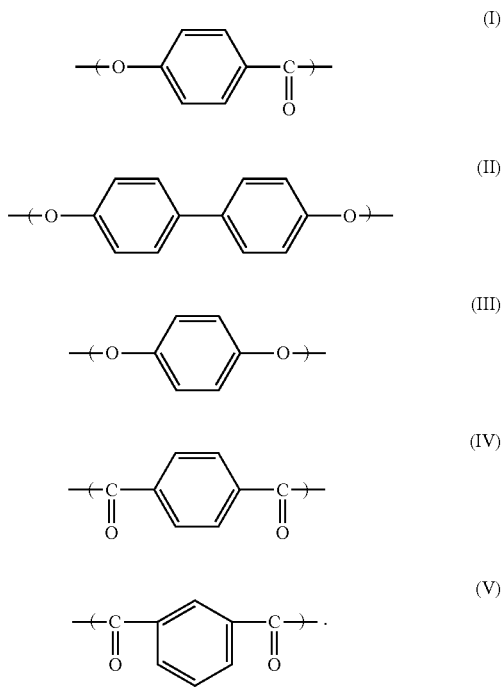

12. A molded product manufactured by injection molding the liquid crystalline polyester composition according to claim 1.

13. A metal composite molded product comprising the molded product according to claim 12, and having a resin part and a metal part joined to the resin part.

14. A connector or a relay comprising the metal composite molded product according to claim 13.

* * * * *